United States Patent [19]
MacKeown

[11] 3,725,976
[45] Apr. 10, 1973

[54] DETACHABLE ADJUSTABLE DRIVE BELT
[76] Inventor: Graeme J. MacKeown, 1100 Parsippany Boulevard, Apt. 30, Parsippany, N.J. 07054
[22] Filed: July 20, 1971
[21] Appl. No.: 164,318

[52] U.S. Cl. ............... 24/31 C, 24/31 B, 24/123 EC, 24/201 S, 287/108
[51] Int. Cl. ............................................. F16g 7/02
[58] Field of Search ........................ 24/21–23, 31 R, 31 B, 31 C, 31 F, 35, 201 S, 230 SL, 206, 123 R, 123 EC; 74/231 J, 233; 285/7; 287/109, 115, 108

[56] References Cited

UNITED STATES PATENTS

| 279,267 | 6/1883 | Nock | 24/123 EC |
|---|---|---|---|
| 3,036,351 | 5/1962 | Root | 24/123 EC |
| 2,295,029 | 9/1942 | Cooney et al. | 24/31 C |
| 1,706,354 | 3/1929 | Geist | 24/31 C |
| 2,934,184 | 4/1960 | Moser | 287/109 |
| 342,850 | 6/1886 | Smith | 24/31 C |
| 2,430,328 | 11/1947 | Daniels | 24/31 C |
| 2,712,950 | 7/1955 | Siebert | 285/7 |

Primary Examiner—Francis K. Zugel
Assistant Examiner—Darrell Marquette
Attorney—Edward Goldberg

[57] ABSTRACT

A drive belt used for power transmission, such as an automobile fan belt, has metal bands secured around the side walls at opposite ends. In one embodiment, the bands have shaped openings or slots in thin metal walls extending beyond each end of the belt. A metal connector sleeve having like shaped wedged embossments or depressions in corresponding side walls is adapted to slidingly engage the bands at the opposite ends of the belt and interlock with the openings to provide a secure coupling and form a detachable continuous belt. A plurality of such shaped embossments spaced along the sleeve at opposite ends permit selection of different lengths for the connected belt which can be adjusted for varying size requirements. Worn, loose and broken belts can thus be easily replaced or tightened without difficult mechanical operations and only a limited stock of belts can accommodate a wide range of different sizes.

10 Claims, 9 Drawing Figures

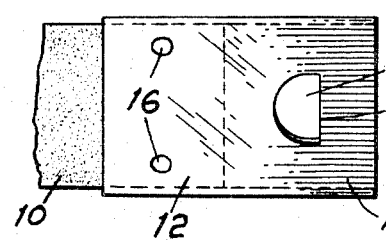
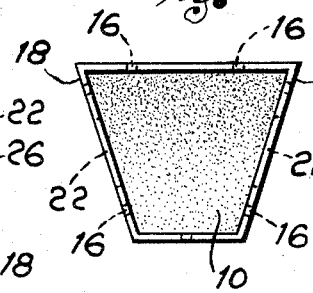
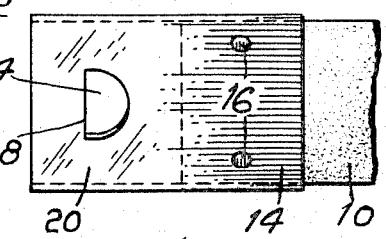
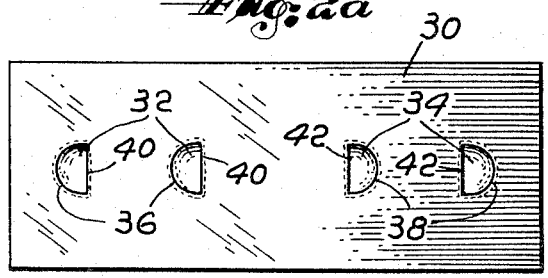
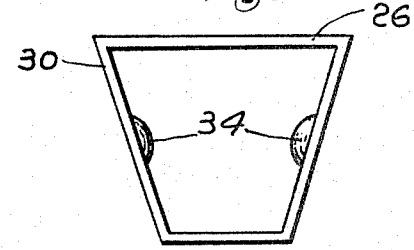
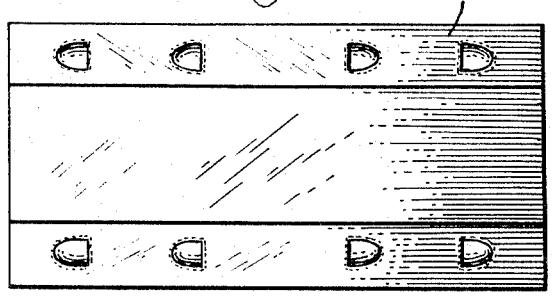
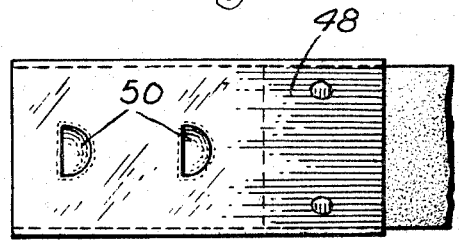
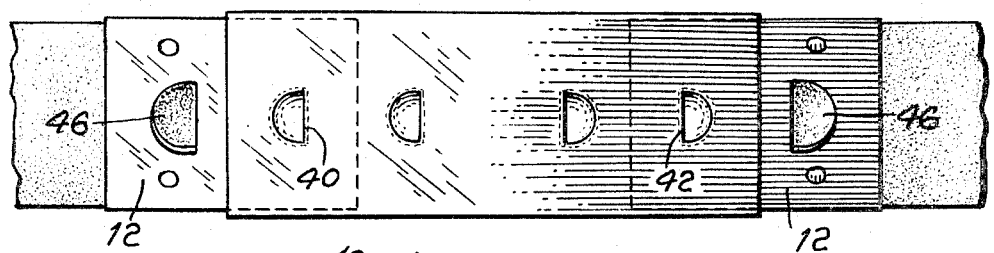
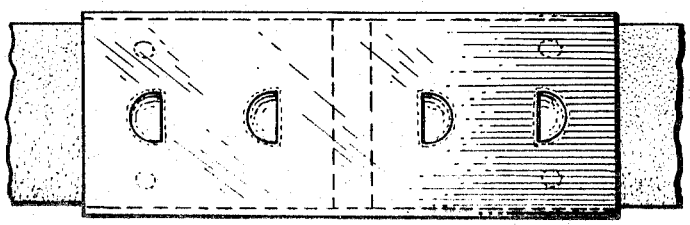
INVENTOR.
GRAEME J. MAC KEOWN
BY Edward Goldberg
ATTORNEY

DETACHABLE ADJUSTABLE DRIVE BELT

BACKGROUND OF THE INVENTION

1. Field of the Invention

The present invention relates to couplings for drive belts and particularly to novel end connections therefor which permit simplified attachment to provide a continuous belt of adjustable length.

2. Description of the Prior Art

Drive belts such as used in automobiles for driving fans, generators and power steering mechanisms, are subject to loosening, wear and breakage and require frequent replacement. Each automobile generally employs a belt of a specified size and length which is often not readily available in an emergency and repair requires time consuming, costly and difficult labor. In addition, special tools may be necessary to loosen the various shafts and pulleys, slip the new belt over the pulleys and retighten the parts to provide the proper tension in the drive belt. There have been adjustable connector type belts proposed in the past, such as shown in U.S. Pat. No. 2,430,328 issued Nov. 4, 1947 and U.S. Pat. No. 1,706,354 issued Mar. 19, 1929, but these have been somewhat complex, inefficient and difficult to manufacture.

SUMMARY OF THE INVENTION

It is therefore the primary object of the present invention to provide a simplified detachable adjustable end connector for a drive belt.

This is achieved by a pair of novel band connections secured around the side walls at opposite ends of the belt. The bands have extensions with shaped slots or openings. A metal sleeve with correspondingly shaped embossments or depressions slidingly engages each end to interlock with the slots and form a continuous belt. A plurality of embossments spaced along the opposite ends of the sleeve permit selection of different adjustable lengths. Other objects and advantages will become apparent from the following description together with the accompanying drawings.

BRIEF DESCRIPTION OF THE DRAWINGS

FIGS. 1a, 1b and 1c show side, end and opposite side views, respectively, of the novel band connectors at the ends of a drive belt, FIGS. 2a, 2b and 2c show side, end and bottom views of the novel sleeve connector engageable with the band connectors, FIGS. 3a and 3b show the assembled sleeve and band connectors coupled together in two adjustable positions, and FIG. 4 shows a modified band connector at one end which includes a sleeve.

DESCRIPTION OF THE PREFERRED EMBODIMENTS

As shown in FIGS. 1a, b and c, a drive belt 10, of a suitable flexible material, has a pair of symmetrical metal bands or ferrules 12, 14 secured around the angled side walls at each end. The bands are preferably made of a metal such as spring steel having sufficient resiliency to bend and regain its shape. The belt and bands are V-shaped with a wide top wall and narrow bottom wall to engage a peripheral groove of a pulley. Dimples or pierced holes 16 in each side of the thin metal walls of each band penetrate and grip the sides of the belt to provide a secure connection. The bands have extending portions 18,20 which extend beyond the opposite ends of the belt. Each extension includes respective openings or slots 22,24 in the side walls. The openings are preferably crescent shaped and have laterally extending flat or straight sides or edges 26,28 adjacent the outer ends of the bands.

A metal connector sleeve 30, shown in FIGS. 2a and b has like angled side walls and symmetrical ends which are adapted to fit over or within and slidably engage the band extensions 18, 20 at opposite ends of the belt 10. The sleeve includes two pairs of oppositely facing crescent shaped depressions or embossments 32,34 on each side at each end which engage the like shaped band openings 22,24. The inwardly protruding depressions are wedge shaped with shallow portions at the rounded outer edges 36,38 which increase in depth toward the inner flat or straight edges 40,42 away from the ends of the sleeve. The flat edges of the depressions form wedges which interlock with the corresponding flat edges 26,28 of the openings in the metal band extending ends.

Use of two such pairs of depressions at each end of the sleeve permits selection of an adjustable belt length for replacement of a damaged original one. In addition, an adjustment can be made to tighten belts which become loose during use and thus extend the life of the belt. This is done merely by pushing the bands at the ends of the belt together further into the sleeve to engage the next or innermost depression, such as the two positions shown in FIGS. 3a and b. In this case additional openings 46 may be added in the metal band base portions 12, 14 around the belt to accommodate the first or outermost sleeve depressions, while the second inner depressions engage the openings in the extended end portions of the bands. In another variation, the second depression may protrude inwardly further than the first which merely slides over and rests on the base or inner band portion without having an added opening 46.

As shown in FIG. 4, the metal band 48 at one end of the belt may be extended and changed to include a number of depressions 50 in place of the openings. In this case the separate sleeve is dispensed with and the band incorporates the features of the sleeve to selectively engage a corresponding opening in the band at the other end of the belt.

Still other variations may include a sleeve which is of smaller width than the metal bands to be inserted within the extended ends and having wedged embossments protruding outwardly to engage the openings. In addition, the metal bands may incorporate the depressions or embossements while the sleeve may have the corresponding openings or slots. In this case the flat and round sides of the crescent shaped wedges and openings would be reversed in direction to maintain the elements in secure engagement under tension.

The dimensions of the band and sleeve elements will vary in accordance with the size of the belt to be utilized. Thus, by way of example only, a belt of about three-fourths of an inch in width across the top would require a band of similar or slightly larger width and about three-fourths inch in length, while the sleeve would also be about the same or slightly larger width than the band to provide sufficient clearance to fit over the band. The length of the sleeve would be somewhat over twice the length of the band or about 1¼ inches to accommodate the two bands at opposite ends. The extended end of the band would be about half the length or ⅝ of an inch and the openings as well as sleeve depressions would be about 3/16 inch long and ⅜ inch high including a slight clearance for the depressions to fit into the openings. Adjacent depressions may be spaced at intervals of about one-fourth inch. The thickness of the metal walls of the bands and sleeve are in the order of one thirty-second to three sixty-fourths of an inch while the depressions protrude another one-sixteenth to one-eighth of an inch to engage the openings.

In practice, in order to replace a torn or broken belt, a service station need only stock continuous rolls of belting material of specified width or cross-section and correspondingly sized sets of band and sleeve coupling elements. The required length and couplings for a particular automobile model can be selected from a chart and the proper length belt cut from the roll. The corresponding metal bands are then slipped over the ends of the belt and clamped in place. A special dimpling tool may be provided which fits around the band to pierce the metal walls and fasten the bands to each end of the belt. The belt is then placed over the pulleys of the related drive shafts which need not be moved and the sleeve pushed over both ends of the belt so that the depressions snap into position to interlock with the band openings and complete the operation.

Thus, the entire method and system for changing and adjusting drive belts is simplified by use of the present novel connector structure. While only selected embodiments of the invention have been illustrated, it is to be understood that many other variations may be made in the particular design and configuration without departing from the scope of the invention as set forth in the appended claims.

What is claimed is:

1. A drive belt coupling comprising:
   an elongated member of resilient flexible material having opposite ends, upper and lower flat parallel walls, and symmetrical angled flat side walls,
   first connecting means including a pair of thin metal bands having like upper and lower flat walls, and angled side walls conforming to the shape of said member walls, said bands being secured to and around said member walls at respective ends, said band walls having portions extending longitudinally beyond each said end, and
   second connecting means including a thin metal sleeve having like flat parallel walls and angled side walls slideably engageable with said band walls extending portions, one of said first and second connecting means having shaped openings through said angled side walls thereof and spaced from the ends thereof, and the other of said connecting means having embossments of substantially the same shape as said openings in corresponding angled side walls and spaced from the ends thereof, said embossments fitting closely within and being interlockable with said openings to provide a detachable continuous belt.

2. The device of claim 1 wherein the extending end portions of one of said bands includes said metal sleeve and is engageable with the extending end portions of the other of said metal bands.

3. The device of claim 1 wherein said openings are in said extending end portions of said bands and said embossments are disposed at each end of said sleeve side walls.

4. The device of claim 1 wherein said one of said connecting means includes a plurality of like shaped openings spaced along the length thereof to selectively engage said embossments in the other said connecting means.

5. The device of claim 3 wherein said sleeve includes a plurality of like shaped embossments spaced along each said end of said sleeve side walls to selectively engage said openings to provide an adjustable length belt.

6. The device of claim 5 wherein the sleeve embossments at opposite ends of said sleeve are symmetrical to engage said openings in each of said extending end portions of said bands at opposite ends of said belt, said bands and sleeve walls having substantially constant dimensions throughout their length.

7. The device of claim 5 wherein said sleeve is of a wider dimension than said bands to slide over said extending end portions, and said openings in said bands are crescent shaped with a laterally extending flat side adjacent the end of said band, said sleeve embossments being like crescent shaped depressions increasing in depth away from the sleeve ends and having a flat wedge portion interlockable with said flat side of said opening.

8. The device of claim 1 wherein said bands have a plurality of pierced holes therein gripping said side walls of said flexible material, said openings being crescent shaped with laterally extending flat portions adjacent said ends of said one connecting means and curved portions extending outwardly from said ends of said one connecting means said embossments being like crescent shaped depressions increasing in depth away from said ends of said other connecting means and having lateral flat wedged portions opposite said ends of said other connecting means interlockable with said flat opening portions.

9. The device of claim 8 wherein said belt, bands and sleeve are V-shaped and include a wide top wall, a narrow bottom wall and angled side walls.

10. The device of claim 7 wherein said bands have further openings in said angled side walls adapted to engage said plurality of sleeve embossments.

* * * * *